United States Patent
Öhman et al.

(10) Patent No.: US 8,289,976 B2
(45) Date of Patent: Oct. 16, 2012

(54) METHOD FOR AUTOMATICALLY PROVIDING A CUSTOMER EQUIPMENT WITH THE CORRECT SERVICE

(75) Inventors: Andreas Öhman, Stockholm (SE); Magnus Larsson, Rånäs (SE)

(73) Assignee: Packetfront Network Products AB, Kista (SE)

( * ) Notice: Subject to any disclaimer, the term of this patent is extended or adjusted under 35 U.S.C. 154(b) by 182 days.

(21) Appl. No.: 12/443,355

(22) PCT Filed: Sep. 27, 2007

(86) PCT No.: PCT/SE2007/050678
§ 371 (c)(1),
(2), (4) Date: Feb. 16, 2010

(87) PCT Pub. No.: WO2008/039148
PCT Pub. Date: Apr. 3, 2008

(65) Prior Publication Data
US 2010/0142523 A1    Jun. 10, 2010

(30) Foreign Application Priority Data
Sep. 28, 2006    (SE) ...................................... 0602029

(51) Int. Cl.
*H04L 12/28* (2006.01)
(52) U.S. Cl. ................................... 370/395.54; 370/389
(58) Field of Classification Search .................. None
See application file for complete search history.

(56) References Cited

U.S. PATENT DOCUMENTS

| | | | |
|---|---|---|---|
| 6,697,360 B1* | 2/2004 | Gai et al. | 370/389 |
| 6,876,667 B1* | 4/2005 | Synnestvedt et al. | 370/466 |
| 7,096,273 B1* | 8/2006 | Meier | 709/236 |
| 7,318,148 B2* | 1/2008 | Scheibli | 713/1 |
| 7,570,647 B2* | 8/2009 | Miyachi | 370/395.32 |
| 7,733,857 B2* | 6/2010 | Wybenga et al. | 370/389 |
| 7,778,203 B2* | 8/2010 | Zhao et al. | 370/254 |
| 2006/0036733 A1 | 2/2006 | Fujimoto et al. | |
| 2010/0142523 A1* | 6/2010 | Ohman et al. | 370/389 |

FOREIGN PATENT DOCUMENTS

| | | |
|---|---|---|
| WO | 02076017 | 9/2002 |
| WO | 2004006503 | 1/2004 |
| WO | 2004042999 | 5/2004 |

OTHER PUBLICATIONS

International Search Report for corresponding application No. PCT/SE2007/050678 completed Jan. 31, 2008.

* cited by examiner

*Primary Examiner* — Robert Wilson
(74) *Attorney, Agent, or Firm* — Renner, Otto, Boisselle & Sklar, LLP

(57) ABSTRACT

The invention relates to a method and a system adapting broadband access equipment to query customer premises switches of a medium access control address located on its physical interface to the customer premises equipment. All customer premises switches are receiving a first request, hereby conducting a lookup in their medium access control address table for the medium access control address. When finding a matching table entry, the customer premises switch housing the medium access control address (MAC) in its table replies with a port name of the specific downlink port, thus identifying the port location of the accessing customer premises equipment and automatically providing a CPE with the correct service depending on which port the CPE is connected to. The customer premises switch is periodically scanning the medium access control address table, continuously transmitting table entries to broadband access equipment.

14 Claims, 2 Drawing Sheets

METHOD FOR AUTOMATICALLY PROVIDING A CUSTOMER EQUIPMENT WITH THE CORRECT SERVICE

TECHNICAL FIELD

The present invention pertains to a method and a system adapting broadband access equipment to query customer premises equipment of their medium access control address located on its physical interface of the customer premises equipment.

BACKGROUND ART

In current broadband networks a network provider offers a physical access connection from an end users home to the broadband network itself. Through this connection multiple services such as Internet, Voice over IP (Internet Protocol), TV over IP, telephony over IP and other services are offered.

Each service may require different termination equipment so called customer premises equipment (CPE) in the end users home. For example, to surf on the Internet a PC is utilized, and to watch TV a "setop box" is utilized.

In order to be able to connect all these devices to the same single physical connection a low cost customer premise switch (CPS) is utilized. This CPS is typically an Ethernet switch or ADSL modem or other device with Ethernet bridging capabilities.

The CPU power and functionality in the CPS switch is often limited. In addition, since the switch is physically located within the end user home, control of traffic, access control to the broadband network etc., for each and every CPE, is typically not a task for the CPS as the risk of fraud would increase. Therefore, broadband access equipment, such as an advanced router or switch, is placed at a central location close to the end user but in a location controlled by the broadband network operator. This device is responsible for creating and delivering the mentioned services to the end user, including access control such as does the end user subscribe to the service, bandwidth control, traffic prioritization and other similar tasks.

When facing multiple client/customer equipment such as a PC and a setop box, it is important for the broadband access equipment to be able to identify each CPE as each of them subscribe to a different service. The PC subscriber may not watch TV channels; the setop box subscriber may not surf on the Internet.

In current broadband networks, identification of the CPE is typically accomplished by using the MAC address (medium access control address, unique network card address) of the specific CPE, or parameters such as vendor id field in a DHCP request (dynamic host configuration protocol request) from the client equipment/CPE to obtain an IP address. When the client equipment requests an IP address, it is typically also time for the broadband access equipment to perform an access control to determine if the client equipment is permitted on the network, and if so which service parameters to install to control the traffic to that specific CPE.

There are several problems with the identification mechanism mentioned. For example, the MAC address is typically bound to a specific network card. If an end user changes PC or replaces the network card, a new MAC address is introduced, and this may require the end user to contact the customer service of the broadband network to have the MAC address record updated. Since the MAC address is a rather complex combination of digits and letters, and since the MAC address is difficult to obtain from within Windows® or to read on the outside of the PC chassis, this quickly becomes too technical for many everyday users.

Utilization of the vendor id field is another option, but as the field name implies, a vendor id from one vendor may not be the same as a vendor id from another vendor. In order to distinguish a PC from a setop box, or even a PC with Windows® from a PC with Linux, the broadband operator has virtually to understand all common vendor identifications (ids) from client equipment that the end user may purchase and use. Again, this is quite complex.

The patent Application US 20060036733 A1 to Fujimoto et al discloses, that a DHCP server can query a CPS regarding the MAC table, which can be utilized to determine if a specific CPE is allowed to connect to the network or not.

SUMMARY OF THE INVENTION

To solve the above given problems and other related to the present technical field, the present invention sets forth a method adapting broadband access equipment to query customer premises switches of a medium access control address located on its physical interface to the customer premises equipment.

Also, one aim of the present invention is to continuously be able to identify and keep track of new customer premises equipment, having an unknown MAC address, on any port of customer premises switches.

One main difference between the above cited US Patent Application 20060036733 A1 is that the US application discloses authentication of CPE units to provide access to the network, but the present invention provides the possibility to deliver an arbitrary service to a CPE connected to a port. Hence, the present invention after authentication of a CPE is utilized to automatically provide a CPE with the correct service depending on which port the CPE is connected to. This can be obtained through for instance the PacketFront® proprietary database named BECS®, or other similar database, which stores information about client CPE's for remote configuration of services.

The present invention thus sets forth that when a customer premises equipment issues a dynamic host configuration protocol request, the medium access control address of an accessing customer premises equipment is obtained from a dynamic host configuration protocol request frame, whereby the customer premises switch, internally, through a medium access control address table, is keeping track of which medium access control address (MAC) is located on a specific downlink port on the customer premises switch. According to one aspect of the invention, there is provided a method for adapting broadband access equipment located on a downlink port of the customer premises switch to the customer premises equipment. thus when a customer premises equipment issues a dynamic host configuration protocol request, said medium access control address (MAC) of an protocol request frame, whereby said customer premises switch, internally, through a medium access control address table, is keeping track of which medium access control address is located on a specific downlink port on said customer premises switch:

implementing a dynamic host configuration protocol interpreter in the broadband access equipment;

receiving a dynamic host configuration protocol request from the specific customer premises equipment, the broadband access equipment sending out a query over the communication protocol to identify the specific downlink port where the customer premises equipment is connected, the query being sent to a communication protocol capable customer premises switch on the layer 2 domain in question, inquiring on which port the medium access control address of the customer premises equipment is located; and the customer premises switch, thus receiving the query, hereby conducting a lookup in their medium access control address table for the medium access control address, upon finding a matching table entry, the customer premises switch housing the medium access control address in its table replying with a port name of the specific downlink port, thus identifying the location of the accessing customer premises equipment and automatically providing a customer premises equipment with the correct service depending on which port the customer premises equipment is connected to.

In one embodiment the customer premises switch periodically scanning the medium access control address table, and continuously transmitting table entries stored in the table to the broadband access equipment.

One embodiment of the present invention comprises that the broadband access equipment implements a dynamic host configuration protocol interpreter which starts a timeout procedure awaiting a reply on the first dynamic host configuration protocol query, and the interpreter restarting data packet processing when receiving a reply of the dynamic host configuration protocol query or at timeout of the timeout procedure.

In one embodiment it is comprised that whenever a client switches from one downlink port to another downlink port of the customer premises switch, dynamic host configuration protocol requests are processed with the current port name identity information.

A further embodiment comprises that customer premises switch is cascade connected to at least one other customer premises switch, the broadband access equipment implementing an algorithm configured to determine the switch topology and to which of the cascade connected switches the customer premise equipment is connected Another embodiment comprises providing cascaded customer premises switches with a unique customer premises switch unit number, wherein downlink ports of each customer premises switch are identifiable using said customer premises switch unit number. Thus, the method provides that customer premises equipment can be connected on any downlink port on a customer premises switch and still be identified.

Yet another embodiment comprises that the broadband access equipment adds information about the port name of the downlink port connected to the customer premise equipment, the information added to the content of the DHCP request from the customer premise equipment Moreover, the present invention sets forth a system adapting broadband access equipment to query a customer premises switch of a medium access control address located on its downlink port of the customer premises switch that is connected to the customer premises equipment. Hence, when a customer premises equipment issues a dynamic host configuration protocol request, the medium access control address of accessing customer premises equipment is obtained from a dynamic host configuration protocol request frame.

Furthermore, the customer premises switch, internally, through a medium access control address table, is keeping track of which medium access control address is located on a specific downlink port on the customer premises switch. The system further comprises:

a dynamic host configuration protocol request interpreter in the broadband access equipment;

the broadband access equipment receiving a dynamic host configuration protocol request from a specific client downlink port, the broadband access equipment sending out a query over the communication protocol to identify the specific downlink port, the query being sent to a communication protocol capable client customer premises switch on the layer 2 domain in question, inquiring on which port the medium access control address is retrieved; and the customer premises switch, thus receiving the query, hereby conducting a lookup in its medium access control address table for the medium access control address, upon finding a matching table entry, the customer premises switch housing the medium access control address in its table replying with a port name of the specific downlink port, thus identifying the port location of the accessing customer premises equipment and automatically providing a customer premises equipment with the correct service depending on which port the customer premises equipment is connected to.

Furthermore, the system is able to perform the embodiments of the above described method according to the attached dependent system claims.

BRIEF DESCRIPTION OF THE DRAWINGS

Henceforth, reference is had to the accompanying drawings throughout the description providing a better understanding for the given embodiments and examples of the present invention, wherein.

DETAILED DESCRIPTION OF PREFERRED EMBODIMENTS

The present invention permits broadband access equipment, providing an access connection to a client, to query the customer premises switch (CPS) regarding which medium access control addresses (MAC addresses) that are located on which physical interface of the CPS. When the client/customer equipment issues a DHCP request, the MAC address of that device can be obtained from the dynamic host configuration protocol request (DHCP request) Ethernet frame. Since the customer premises switch (CPS), an asymmetric digital subscriber line modem (ADSL modem) or Ethernet switch, internally keeps track of which MAC address is located on which downlink port, the query from the broadband router can be replied provided that the CPS supports a protocol for this purpose.

The benefit of this solution is that it allows an end user/client/customer to connect a setop box to one port, and a PC to another port and thereby automatically obtain the relevant broadband service for each client regardless of the clients MAC address or vendor id or other characteristics.

Furthermore, it allows the CPS vendor to mark (by color and or symbol) which port on the CPS to use for what intended purpose. TV may be depicted by a TV symbol and/or for instance red in color. Internet may be depicted as the letter I in yellow color, IP telephony depicted with the letter T and blue for instance.

An end user can then be provided a simple instruction to connect their setop box to the red TV interface on their CPS, connecting their PC to the yellow I interface on the CPS, and their IP telephone to the blue T interface. This solution simplifies for the end user and reduces the amount of information the broadband operator needs to know about each type of client equipment used by end users in the network.

Figure 1:
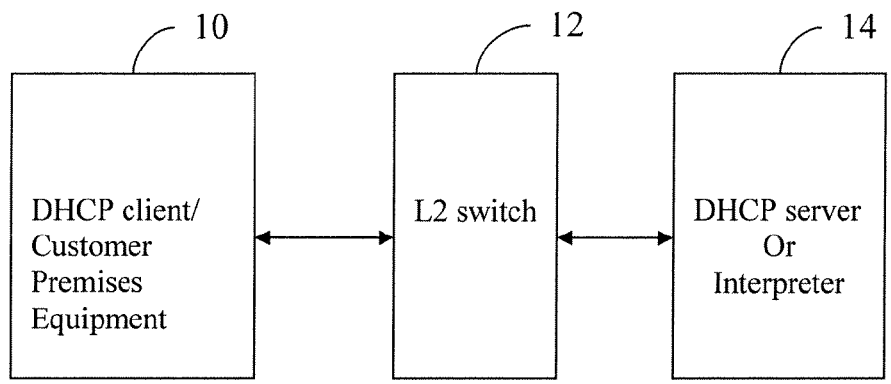
FIG. 1 schematically illustrating a DHCP server comprising an interpreter in accordance with the present invention.

Now, with reference to FIG. 1, schematically illustrating a system comprising a DHCP server or an interpreter or any other device capable of interpreting DHCP packets 14 such as relay agent, server, snooper, which can interpret DHCP packets. In a topology according to the following, a DHCP client 10 is connected to an open systems interface (OSI) layer2 switch (L2-bridge/switch) 12. The bridge/switch 12 is connected to a DHCP server or a DHCP interpreter or other device that can interpret DHCP packets 14. Henceforth, the DHCP server or interpreter or other device that can interpret DHCP packets is referred to as the interpreter 14.

When a DHCP Discover/Request/Release/regarding an IP address from the client arrives, the port on the L2-switch 12 on which the DHCP packet arrived has to be identified. Based on that information, the service the client 10 requires is derived, or if the client 10 should not even have a specific service.

When the interpreter 14 receives the sent packet, it recognizes the MAC address of the client 10 from the source MAC or the chaddr (client hardware address) in the DHCP packet, but the interpreter 14 still has no information on which L2-switch 12 port the packet arrived. The L2-switch 12 populates a MAC address table based on the src (source) MAC. The information on which port the packet arrived is thus available in the L2-switch. Hence, the interpreter 14 thus in accordance with the present invention is able to send a request to the L2-switch 12 querying on which port this MAC address is located. Now, the interpreter 14 can extend the DHCP packet with a sub option in option 82 (DHCP option, interpreter information option field in the packet) and forward it to the DHCP server, or if it is a DHCP server receiving the packet it can use this information in selecting which type of service this client should have such as what IP address and which options that should be appended.

The DHCP implementation of the present invention is adapted to act both as a DHCP interpreter or a server or a DHCP snooper and is henceforth only named "interpreter", which is a module in PacketFronts® proprietary router OS iBOS. The L2-switch mentioned thus constitutes the CPS. When a DHCP discover is received from a previously unknown client 10, the interpreter immediately sends out a request over a device protocol for instance Packetfronts proprietary device protocol (PFDP). The PacketFront Device Protocol is an L2 protocol utilized to exchange information between PacketFront Devices that are situated on the same L2 domain. This request is sent to all PFDP capable devices on that L2 domain, querying if any device has knowledge of this MAC address.

When the CPS receives this request it accomplishes a lookup in its MAC address table to find whether this entry exists in its table. If the entry exists the CPS will reply with a port name of where the clients 10 CPE is located. See FIG. 2 for MAC table residing in a CPS 16, 18. Now, the interpreter in one embodiment of the present invention starts a timeout procedure and waits for a reply on the request. As soon as a reply arrives or the timeout expires, the interpreter restarts the packet processing of the mentioned DHCP discover.

Thereafter, the CPS periodically scans its MAC address table, and continuously sends/relays the table to the interpreter. Whenever a client 10 changes its CPE port settings, the next DHCP messages can be processed with the latest port name information.

The present invention is thus accomplished, in one embodiment, by equipping the L2-switch 12 in FIG. 1 with software composed to reply interpreter queries, by utilizing a communication protocol such as PFDP.

Figure 2:
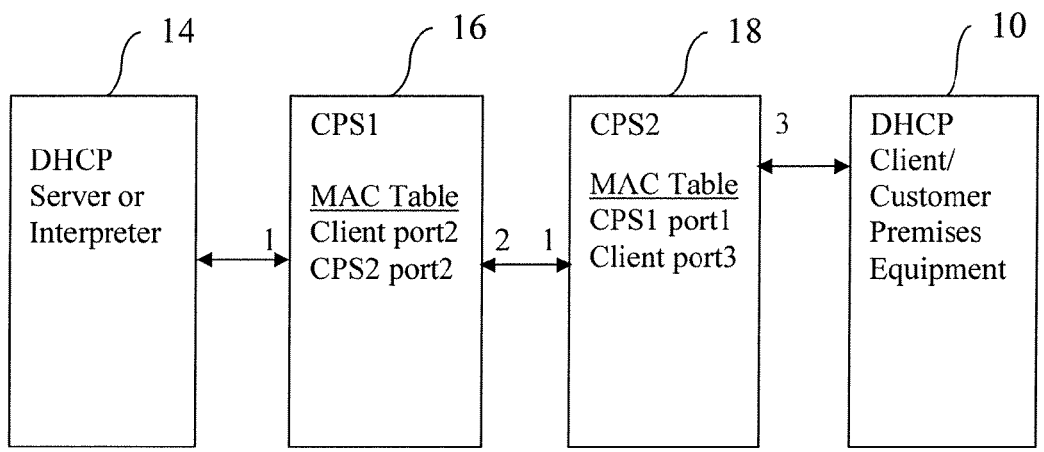
FIG. 2 schematically illustrates an embodiment of the present invention comprising cascaded customer premises switches and their MAC address tables in accordance with the present invention.

FIG. 2 schematically illustrates an embodiment of the present invention comprising cascaded customer premises switches. A further development of the present invention method and system provides that cascaded CPS's 16, 18 are utilized in accordance with the present invention, thus being able to recognize discover/request/release from a cascaded CPS 18. Since multiple replies are received on a broadcasted request, the clients 10 entry will show up in two or even more responses.

This is accomplished by traversing the different L2 tables residing in the CPS 16, 18, and composing a table entry topology in the interpreter 14 housing the interpreter. A request is issued for each MAC address, of the different CPS's, CPS 16, and CPS2 18, respectively that replied on the first request. The only CPS that will have the clients MAC address and no other CPS MAC address on that specific utilized client 10 port 2, is the CPS1 16 which physically has the client connected to it via a cascaded CPS2 18. Hence if several MAC addresses reside in the CPS 16 MAC table, it is with necessity decided that CPS2 18 has the CPE connected to a port. As is seen in FIG. 2, the CPS1, 16, MAC table indicates that CPS1 has client CPS2 connected to its client port 2, and CPS2 has CPS1 connected to its port 1 and the CPS2 client CPE is connected the CPS2 port 3. This notion is relayed to the Interpreter 14 updating the port connection for newly connected CPEs in accordance with the present invention.

By utilizing the method of cascading CPS 16, 18 it is automatically possible to number the CPS through the traversing. It is thus possible to pre-append the CPS port 1 16, and CPS port 2 18 with a unit number.

In the above given embodiment it is possible to call/address the client 10 "CPS2.port2", see FIG. 2, even if the one (or both) of the CPS 16, 18 are exchanged with other physical units, having other MAC addresses. The client 10 still has the same port name "CPS2.port2".

Figure 3:
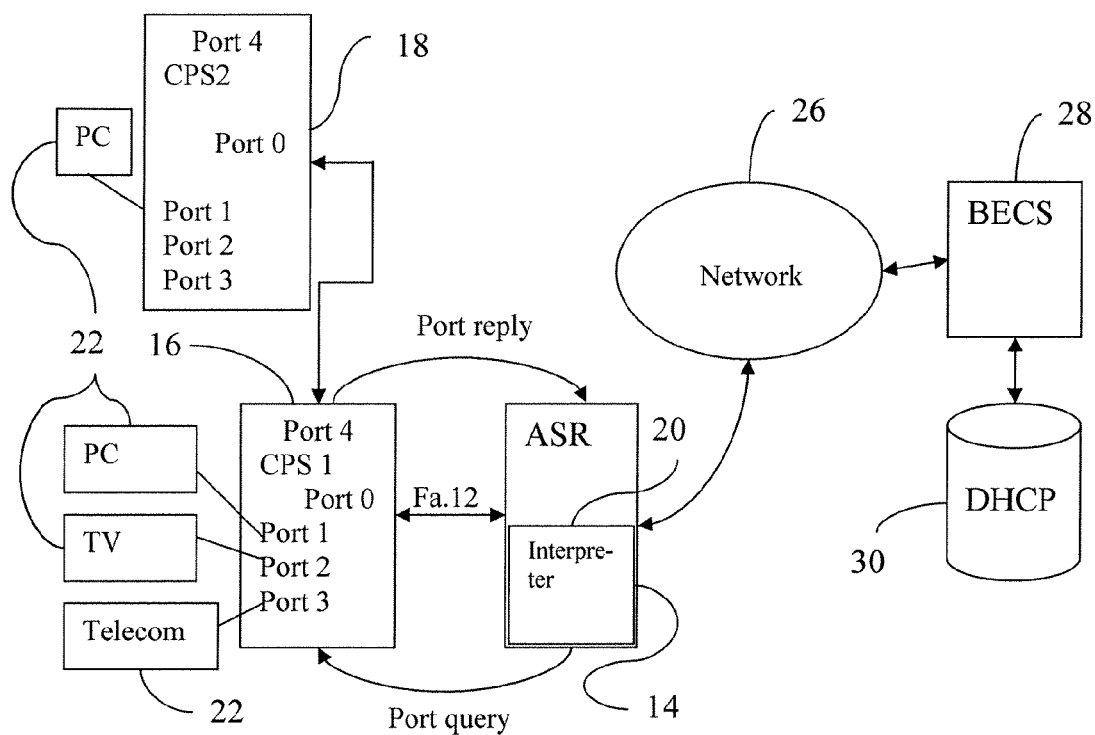
FIG. 3 schematically illustrates an embodiment of the present invention comprising cascaded customer premises switches connected to a broadband access equipment in accordance with the present invention.

FIG. 3 schematically illustrates an embodiment of the present invention comprising customer premises equipment 22 connected to cascaded customer premises switches/routers 16, 18. In the embodiment of FIG. 3, the interpreter 14 software is schematically depicted as residing in an ASR router/switch 20 (Advanced Service Router a Packetfront device) relaying discover/request/release through a network 26 to a PacketFront® proprietary database named BECS® 28 and further to a DHCP server 30 for assignment of IP addresses. BECS® stores information about client 10 CPS's 16, 18 for remote configuration. Schematically depicted in FIG. 3 is also the port setting of the CPS's 16, 18, having ports 0-4. CPE is depicted as PC, TV, Telecom 22.

In one embodiment of the present invention it is possible for broadband access equipment 20 to add information about the port name where the customer premises equipment 22 is connected to the content of the dynamic host configuration protocol request from the customer premise equipment 22. Hence, the broadband access equipment 14 is able to add the port identity to the DHCP request from a connecting CPE 16, 18 in order to simplify for the DHCP server 30 to choose IP address, suitable parameters, and service to be provided the CPE. This makes it possible for the DHCP server 30 to utilize functions that already exist in the DHCP server 30. This in contradiction to the teaching of the above cited Patent Application US 20060036733 A1, where the DHCP server has to be adapted to accomplish such a purpose.

It is appreciated that an L2 domain depending on the same device protocol conventionally houses several more customer premises switches 16, 18 utilized by several clients 10. Only one client 10 is shown in the attached drawings for sake of simplicity for the reader. Also appreciated is that the attached set of claims determine further possible embodiments to a person skilled in the art without departing from the scope of the present invention.

The invention claimed is:

1. A method for providing service to customer premises equipment, said method comprising:
   receiving by broadband access equipment a dynamic host protocol request (DHCP) from a specific downlink client requesting service for said customer premises equipment and forwarding said DHCP request to a customer premises switch that is on the same layer 2 domain as the specific downlink client;
   upon receiving the DHCP request, said customer premises switch retrieving a MAC address of the specific downlink client and using said MAC address of the specific downlink client to determine a downlink port name and a service associated with the customer premises equipment and automatically providing said service to said customer premises equipment.

2. The method according to claim 1, further comprising periodically scanning, via said customer premises switch for MAC addresses stored in a table in the customer premises switch, and continuously transmitting, via said customer switch, table entries stored in said table to said broadband access equipment.

3. The method according to claim 1, further comprising starting in the broadband access equipment a timeout procedure awaiting a reply on the DHCP request, and to restart data packet processing when receiving the reply of the DHCP request or at timeout of the timeout procedure.

4. The method according to claim 1, wherein when a client changes from one downlink port to another downlink port of the customer premises switch, processing DHCP requests with the current downlink port name.

5. The method according to claim 1, wherein said customer premises switch is cascade connected to at least one other customer premises switch, further comprising determining, via said broadband access equipment, which of the cascade connected switches is connected to the customer premise equipment.

6. The method according to claim 5, further comprising providing said cascaded customer premises switches with a unique customer premises switch unit number, wherein downlink ports of each customer premises switch are identifiable using said customer premises switch unit number, thereby enabling identification of customer premises equipment connected on any downlink port of a customer premises switch.

7. The method according to claim 1, further comprising adding information corresponding to the port name of the downlink port connected to the customer premises equipment, said information added to the content of the DHCP request from the customer premise equipment.

8. A system, comprising:
   customer premises equipment;
   specific downlink client;
   broadband access equipment; and
   customer premises switch,
   wherein said customer premises equipment is connected to said specific downlink, client, and wherein said broadband access equipment executes host configuration interpreter module to perform the following:
   receive a dynamic host protocol request (DHCP) from said specific downlink client requesting service for said customer premises equipment and forwards said DHCP request to said customer premises switch that is on the same layer 2 domain as the specific downlink client;
   wherein said customer premises switch performs the following:
   upon receiving the DHCP request retrieves the MAC address to the specific downlink client and uses said MAC address of the specific downlink client to determine a port name and a service associated with the customer premises equipment and automatically provides said service to said customer premises equipment.

9. The system according to claim 8, wherein said customer premises switch is configured to periodically scan for MAC addresses stored in a table in the customer remises switch, and continuously transmit table entries in said table to said broadband access equipment.

10. The system according to claim 8, wherein said broadband access equipment is configured to start a timeout procedure awaiting a reply on the query, and to restart data packet processing when a reply of the DHCP request is received or at timeout of the timeout procedure occurs.

11. The system according to claim 8, wherein when a client changes between one downlink port to another downlink port of the customer premises switch, said broadband access equipment is configured to process DHCP requests with the current port name.

12. The system according to claim 8, wherein said customer premises switch is cascade connected to at least one other customer premises switch, and said broadband access equipment is configured to determine which of the cascade connected switches is connected to the customer premise equipment.

13. The system according to claim 12, wherein said cascaded customer premises switches are provided a unique customer premises switch unit number, wherein downlink ports of each customer premises switch are identifiable using said customer premises switch unit number, thereby enabling identification of customer premises equipment connected on any downlink port of a customer premises switch.

14. The system according to claim 8, wherein said broadband access equipment is configured to add information corresponding to the port name of the downlink port connected to the customer premises equipment, said information added to the content of the DHCP request from the customer premise equipment.

* * * * *